(12) United States Patent
Kennedy et al.

(10) Patent No.: US 7,795,574 B2
(45) Date of Patent: *Sep. 14, 2010

(54) LOW-LIGHT VIEWING DEVICE FOR DISPLAYING IMAGE BASED ON VISIBLE AND NEAR INFRARED LIGHT

(75) Inventors: Jeffrey Kennedy, San Juan Capistrano, CA (US); Gary Palmer, Carlsbad, CA (US)

(73) Assignee: Xenonics, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/015,040

(22) Filed: Jan. 16, 2008

(65) Prior Publication Data

US 2009/0091634 A1 Apr. 9, 2009

Related U.S. Application Data

(63) Continuation-in-part of application No. 11/638,203, filed on Dec. 13, 2006, now Pat. No. 7,420,153, which is a continuation of application No. 11/257,300, filed on Oct. 24, 2005, now Pat. No. 7,173,237, and a continuation-in-part of application No. 11/060,903, filed on Feb. 18, 2005.

(60) Provisional application No. 60/880,572, filed on Jan. 16, 2007, provisional application No. 60/621,415, filed on Oct. 22, 2004, provisional application No. 60/546,812, filed on Feb. 23, 2004.

(51) Int. Cl.
*H01J 40/14* (2006.01)

(52) U.S. Cl. ............................. 250/214 VT; 250/208.1

(58) Field of Classification Search ........... 250/214 VT, 250/214.1, 208.1, 239, 330–332; 359/399, 359/405, 359; 348/216.1, 217.1
See application file for complete search history.

(56) References Cited

U.S. PATENT DOCUMENTS 4,896,218 A 1/1990 Vick (Continued)

FOREIGN PATENT DOCUMENTS

EP 0 352 831 A1 1/1990

(Continued)

OTHER PUBLICATIONS

European Search Report dated Jul. 14, 2008.

(Continued)

*Primary Examiner*—Que T Le
(74) *Attorney, Agent, or Firm*—Howard IP Law Group, PC (57) ABSTRACT

A low-light viewing device includes a housing, having mounted thereto: a lens, an electronic camera for receiving light focused by the lens and for providing an output signal; a display for receiving the output signal and displaying an image detected by the camera; a controller for controlling the camera and the display, and a user interface for operating the controller. The lens may be a fixed focus lens having an F number of less than about 1, and a T number of less than about 1.5. The display may have a resolution at least as great as the resolution of the camera. The device may have a processor programmed to provide control signals to the camera and display depending on a selected light environment.

22 Claims, 9 Drawing Sheets

U.S. PATENT DOCUMENTS

| | | |
|---|---|---|
| 5,113,177 A | 5/1992 | Cohen |
| 5,200,827 A | 4/1993 | Hanson et al. |
| 5,396,069 A | 3/1995 | Craig et al. |
| 5,408,359 A | 4/1995 | Ferrett et al. |
| 5,729,016 A | 3/1998 | Klapper et al. |
| 5,815,126 A | 9/1998 | Fan et al. |
| 5,880,777 A | 3/1999 | Savoye et al. |
| 5,943,174 A | 8/1999 | Bryant et al. |
| 5,949,582 A | 9/1999 | Coombs |
| 6,116,744 A | 9/2000 | Batterman |
| 6,388,707 B1 | 5/2002 | Suda |
| 6,538,820 B2 | 3/2003 | Fohl et al. |
| 6,560,029 B1 | 5/2003 | Dobbie et al. |
| 6,570,147 B2 | 5/2003 | Smith |
| 6,603,507 B1 | 8/2003 | Jiang et al. |
| 6,614,606 B2 | 9/2003 | Jones |
| 6,721,014 B1 | 4/2004 | Ariga |
| 7,049,597 B2 * | 5/2006 | Bodkin .................. 250/353 |
| 2001/0036363 A1 | 11/2001 | Shimose |
| 2002/0030163 A1 | 3/2002 | Zhang |
| 2002/0067413 A1 | 6/2002 | McNamara |
| 2002/0122302 A1 | 9/2002 | Palmer |
| 2003/0015662 A1 | 1/2003 | Yang et al. |
| 2006/0104628 A1 | 5/2006 | Hasegawa et al. |
| 2007/0246641 A1 | 10/2007 | Baun |

FOREIGN PATENT DOCUMENTS

| | | |
|---|---|---|
| EP | 1608151 A1 | 12/2005 |
| GB | 2166259 | 4/1986 |
| WO | WO 99/33684 | 7/1999 |
| WO | WO 03/025655 A2 | 3/2003 |
| WO | 03/096216 A1 | 11/2003 |
| WO | 03096216 | 11/2003 |
| WO | 2004066616 A1 | 8/2004 |

OTHER PUBLICATIONS

Communication dated Jan. 29, 2010 issued in related EP Patent Application N°08100522.5.

European Search Report date May 10, 2010 for related European application 05 81 3013.

* cited by examiner

LOW-LIGHT VIEWING DEVICE FOR DISPLAYING IMAGE BASED ON VISIBLE AND NEAR INFRARED LIGHT

RELATED APPLICATIONS

This application claims the benefit of U.S. Provisional Patent Application No. 60/880,572, filed Jan. 16, 2007, which application is incorporated herein by reference in its entirety, and is a continuation-in-part of U.S. patent application Ser. No. 11/638,203, filed Dec. 13, 2006, now U.S. Pat. No. 7,420,153, which is a continuation of U.S. patent application Ser. No. 11/257,300, now U.S. Pat. No. 7,173,237, filed Oct. 24, 2005, which claims benefit of U.S. Provisional Patent Application No. 60/621,415, filed Oct. 22, 2004, and which is a continuation-in-part of U.S. patent application Ser. No. 11/060,903, filed Feb. 18, 2005, which claims benefit of U.S. Provisional Patent Application No. 60/546,812, filed Feb. 23, 2004, all of which applications are incorporated herein by reference in their entireties.

FIELD OF THE INVENTION

The present invention relates generally to optical devices that enable a viewer to detect, recognize, identify and observe objects under low-light conditions, and more particularly, to a handheld, digital low-light viewing system.

BACKGROUND OF THE INVENTION

Low-light viewing systems are widely used in the military to provide soldiers, aviators and sailors with the ability to view objects at night or during other low-light conditions. As a result, many low-light viewing devices are currently being manufactured according to exacting military specifications and designs. Similarly, many such low-light devices are being manufactured for specific military applications, such as part of the sights of various weapons or as part of goggle assemblies that attach to an aviator's or soldier's helmet. However, many of the present low-light viewing devices currently being manufactured are neither affordable nor easily adapted to non-military uses.

Low-light viewing devices fall into several broad categories, including: (1) image intensified products, (2) thermal imaging products, and (3) charge-coupled device (CCD) and complementary metal-oxide-semiconductor (CMOS) low-light cameras. The image intensified and thermal imaging devices are often found in the military, law enforcement, fire fighting, and consumer markets. In recent years a number of low-light viewing devices have been introduced into the consumer market, but are often of poor quality and/or offer the user limited capabilities.

Image intensified low-light viewing devices tend to be very expensive and require sophisticated, heavy lenses to produce long range images. Image intensified devices are also quite prone to damage if used in high-light situations. This characteristic renders such products virtually useless in most urban areas. Moreover, due to excessive cost, thermal imaging devices have not been widely accepted.

Low-light CCD cameras are commonly employed in security applications. In recent years, cell phone technology, as well as a tremendous surge in the application of cameras in the security business, has provided for very inexpensive cameras. Low-light CCD cameras are designed to be sensitive at a wavelength in the electromagnetic spectrum that is invisible to human beings, making these cameras very effective in low-light conditions, particularly if active infrared (IR) illumination is employed.

Devices that utilize active IR illumination often utilize integral LEDs to illuminate dark scenes. As the use of integral LEDs renders the devices active devices, i.e., providing IR illumination to assist in detection, the devices consume power quickly.

The aforementioned devices are deficient in several respects, precluding practical use in both commercial arenas and by the military and law enforcement agencies. Such devices tend to be both heavy and fragile, are unable to withstand the shock of impact and wear and tear caused by regular military or law enforcement use, and are easily permeated by water or moisture that can render them inaccurate or even unusable.

These devices also tend to have relatively short ranges, are bulky, are not ergonomic in design, and lack simplified user controls. Moreover, such devices can be quite costly, often requiring proprietary components and elaborate assembly techniques, making them impractical for widespread military or law enforcement use.

Accordingly, there exists a need for a ruggedized, handheld digital low-light viewing device well suited for military, law enforcement, security and first responder use, which can be operated with one hand, is lightweight and waterproof, and which contains additional features not presently available in prior devices and operable in conjunction with current low-light sensor technology.

SUMMARY OF THE INVENTION

According to an aspect of the present invention, a low-light viewing device comprises a housing, having mounted thereto: a fixed focus lens, an electronic camera for receiving light focused by the lens and for providing an output signal; a display having a resolution at least as great as the resolution of the camera for receiving the output signal and displaying an image detected by the camera; a controller for controlling the camera and the display, and a user interface for operating the controller. The lens may have an F number of less than about 1, and a T number of less than about 1.5. The device may have a processor programmed to provide control signals to the camera and display depending on the amount of ambient light.

According to an aspect of the invention, a low-light viewing device has a housing, having mounted thereto: a lens; an electronic camera having a resolution of at least about 800 by 640 pixels for receiving light focused by the lens and for providing an output signal responsive to visible light and near infrared light received by the lens; a display having a resolution greater than a resolution of the camera for receiving the output signal and displaying an image detected by the camera; a controller operatively coupled to the camera and the display for controlling the camera and the display, and a user interface operatively coupled to the controller for operating the controller.

According to an aspect of the invention, a method for providing low-light viewing includes focusing, via a lens mounted on a housing, visible and infrared light on to a camera within the housing; receiving a user selection of light environment level at a user interface on the housing; providing control signals, based on the selected light environment, from a controller in the housing to the camera and to a display within the housing; implementing camera settings based on the control signals; providing, from the camera, an output signal indicative of a focused image; implementing display settings based on the control signals; and displaying an image based on the output signal at the display.

According to an aspect of the invention, a low-light viewing device has a housing having a planar top surface; opposing side walls which taper gradually outward from opposite edges of the top surface, and taper gradually inward to edges of a generally planar lower surface; a lens mounted on one end of the housing; an electronic camera within the housing for receiving light focused by the lens and for providing an output signal responsive to visible light and near infrared light received by the lens; a display for receiving the output signal and displaying an image detected by the camera and mounted on an end of the housing opposite the lens; a controller operatively coupled to the camera and the display for controlling the camera and the display, and a user interface defined in the top surface of the housing and operatively coupled to the controller for operating the controller.

According to an aspect of the invention, a method for providing low-light viewing includes: focusing, via a lens mounted on a housing, visible and infrared light on to a camera within the housing; receiving a user selection of light environment level at a user interface on the housing; providing control signals, based on the selected light environment, from a controller in the housing to the camera and to a display within the housing; implementing camera settings based on the control signals; providing, from the camera, an output signal indicative of a focused image; implementing display settings based on the control signals; and displaying an image based on the output signal at the display.

The assembly of the present invention further provides for still image and/or video capture of an object viewed by the assembly by means of a simple control mechanism or switch operatively coupled to the camera assembly and to the signal processor for capturing and processing the image data for storage and retrieval. Memory sufficient to store such image data is included within the assembly, and a mechanism is provided for downloading the stored or captured image data to a remote device (e.g. a printer, computer or other peripheral device), such as a USB port or other interface. The digital low-light viewing assembly of the present invention further includes software and/or hardware functionality for implementing control program functions and enabling user selection of certain program mode features associated with the low-light assembly.

DETAILED DESCRIPTION OF PREFERRED EMBODIMENTS

To address the problems of the prior art, an embodiment of the present invention provides a low-light viewing device capable of converting low-intensity visible light and infrared energy into a visible image. In an embodiment, the device is passive. In an embodiment, the device is ruggedized. In an embodiment, a digital low-light viewing assembly consistent with the present invention generally includes a sensitive digital camera having still/video image capture functionality, an LCD, OLED LCOS, CRT or plasma display having resolution greater than the resolution of the sensing device of the camera, a fixed focus lens with a low F-number, such as 1.0 or less, and a t-number of 1.5 or less, and control electronics as will be described in further detail below.

A disadvantage of prior art low light viewing devices is the loss of available light in lenses. For example, zoom lenses have an F number varying from about 1.6 to about 2.8 at highest magnification, resulting in loss of light striking the lens. By way of example, a lens having an f-number of 1.2 or greater and a t-number of 2 or greater typically transmits only about 10% of the light striking the primary aperture.

With reference now to FIGS. 1-5, external views of an exemplary low-light vision assembly 100 consistent with one embodiment of the present invention are illustrated. As shown, the assembly 100 includes a housing 105, having a lens 110 projecting from one end thereof, and an eyepiece 115 projecting from an opposing end thereof. Assembly 100 is configured as a monocular. Housing 105 is generally rectangular, having a top surface 106 having a user interface 120 defined thereon. User interface 120 includes a keypad, which includes an arrangement of switches or buttons 121a, 121b, 121c, 121d, 121e. The top surface 106 is generally planar, and the buttons or switches are arranged in relatively close proximity to one another to render operation by a single digit of a user feasible.

Housing 105 has opposing side walls 107a, 107b, which taper gradually outward from opposite edges of top surface 106, and taper gradually inward to edges of lower surface 108. The inward tapering of side walls 107a, 107b renders the device 100 more readily held in one hand. Lower surface 108 is generally planar, and has substantially the same length as top surface 106, but is more narrow. Side walls 107a, 107b have a readily gripped surface, in the form of ribbed pads 109a, 109b, which may be of an elastomer or similar resilient material with a surface having a high coefficient of friction. At 111a, 111b, as can be seen, for example, in FIGS. 4 and 5, a tab is provided spaced slightly outward from the side surface to accommodate a strap. A strap may be attached at 111a, 111b to fit around the fingers of a user while the device is in use; the use of the strap permits the user to relax a grip on the device while still maintaining the device in a desired position, and avoiding dropping of the device. Handles 112a, 112b attached to the front and rear of housing 105, and free to rotate, have an elongated opening therethrough for additional gripping or to receive a strap.

Figure 1:
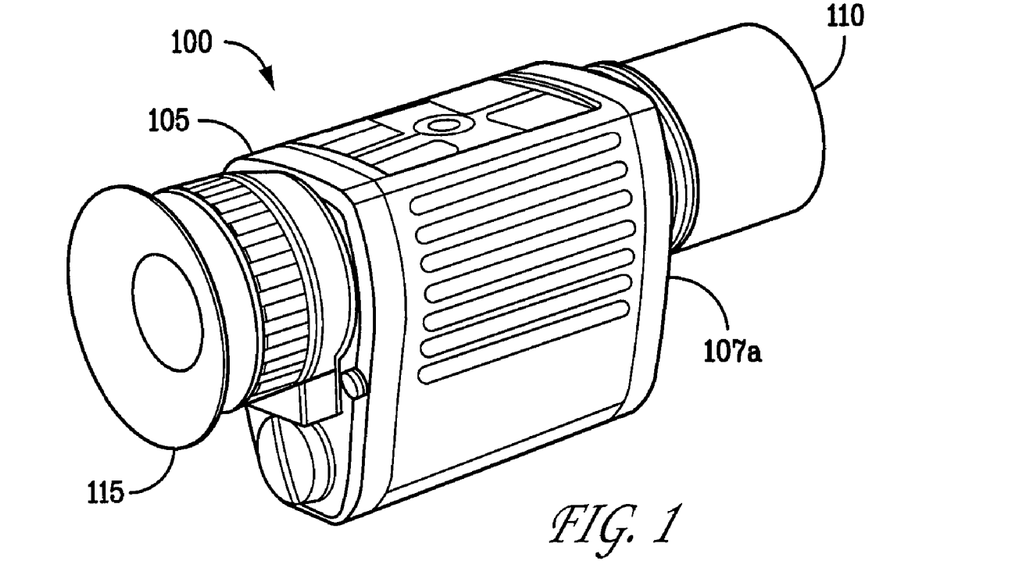
FIG. 1 is a perspective view of an exemplary low-light viewing assembly consistent with one embodiment of the present invention.
Figure 2:
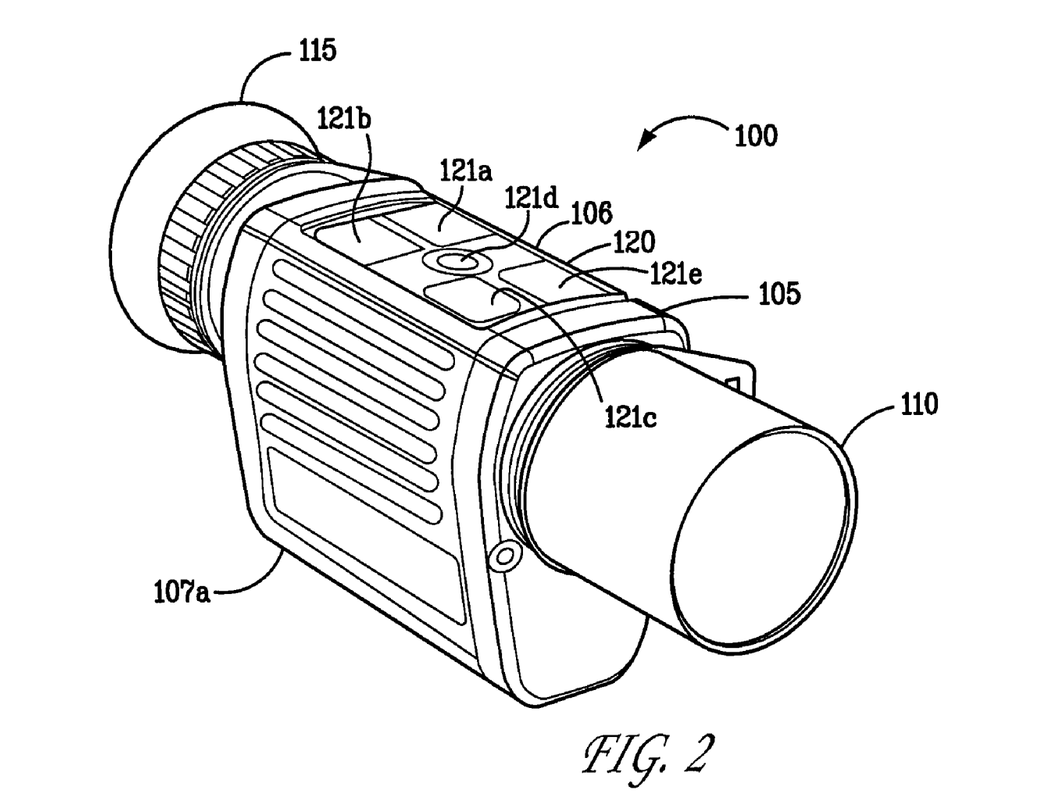
FIG. 2 is a perspective view from another angle of the exemplary low-light viewing assembly of FIG. 1.
Figure 3:
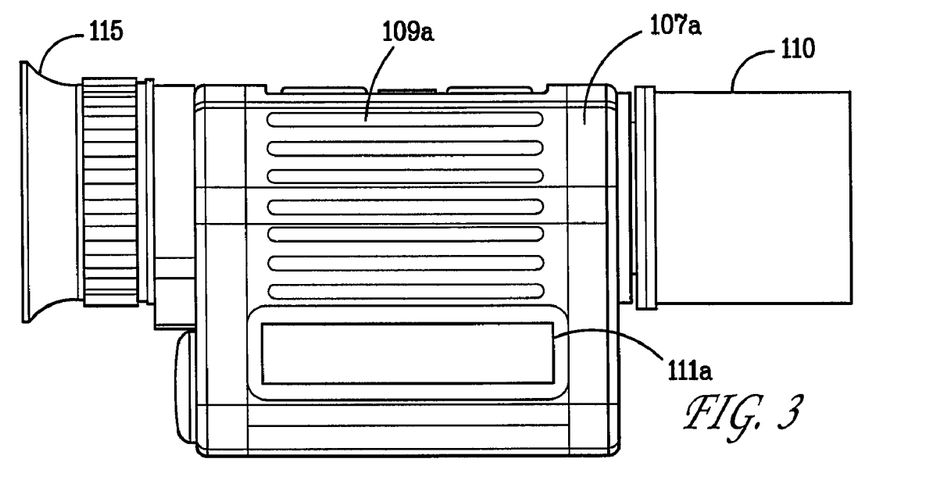
FIG. 3 is a side plan view of the exemplary low-light viewing assembly of FIG. 1.
Figures 4, 5:
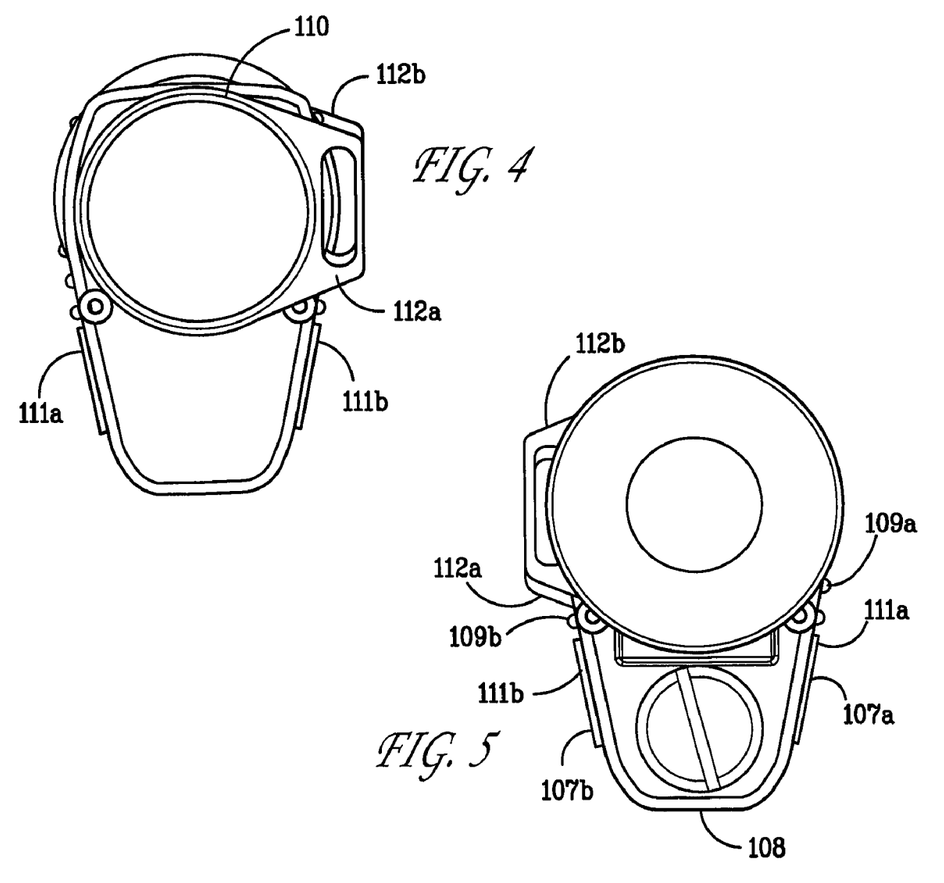
FIG. 4 is a front plan view of the exemplary low-light viewing assembly of FIG. 1
FIG. 5 is a rear plan view of the exemplary low-light viewing assembly of FIG. 1
Figure 6:
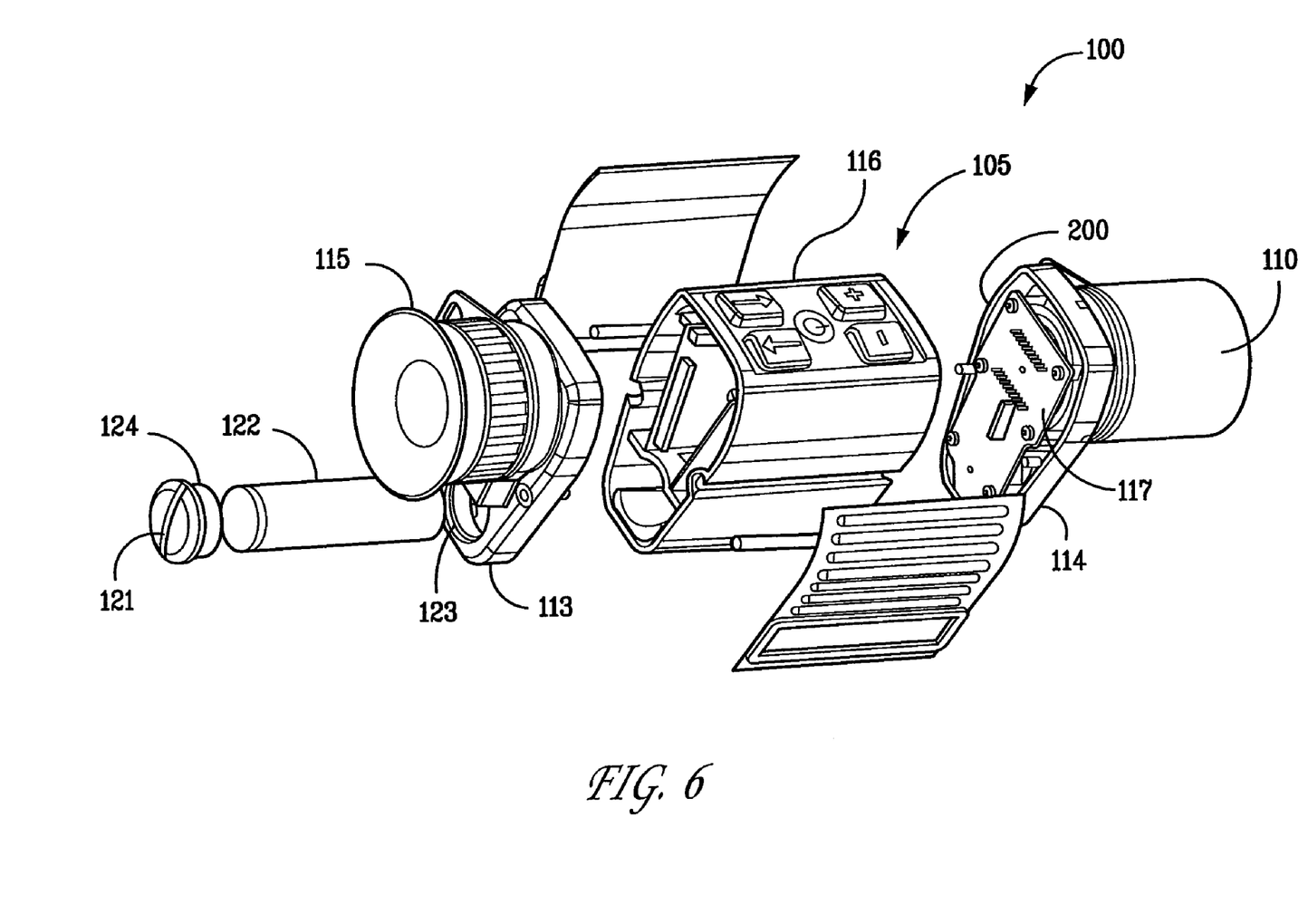
FIG. 6 is an exploded view of the exemplary low-light viewing assembly of FIG. 1.

Referring now to FIG. 6, an exploded view of device 100 is shown. Housing 105 includes front cover 113 and rear cover 114, which mate with a central portion 116. The front cover 113 and rear cover 114 may be made detachable and removable (e.g., by interference or friction fit) for access to components on the interior of the housing assembly (e.g., to replace circuit board components or make repairs) or may be permanently sealed. Housing 105 may also be monolithic in structure, or may comprise two halves coupled together.

All of the exterior components of the assembly 100 are desirably sealed to the housing 105 so as to provide a generally waterproof and moisture-proof device. The housing 105 may be formed from a highly protective material, e.g., a heavy-gauge steel, magnesium, zinc, aluminum, rubberized aluminum, polycarbonate, or plastic material. The housing 105 may further contain within its interior cushioning elements such as a foam material, soft rubber, plastic or other cushion-like material, for protecting the internal electronic and mechanical components including the control electronics from damage due to drop, vibration and shock.

Camera 110 is coupled to end cover 114. Printed circuit board 117, which may include electronics associated with camera 110, is shown. Display assembly 115 is shown coupled to end cover 113. Battery screw 121 mates with a threaded opening 123 in cover 113. Battery screw 121 may have an O-ring 124 thereon to provide a watertight seal. Battery 122 may be replaced by unthreading and then refastening battery screw 121, without disturbing any other components in housing 105. As noted below, a separate battery compartment may be provided in housing 105.

Figure 7:
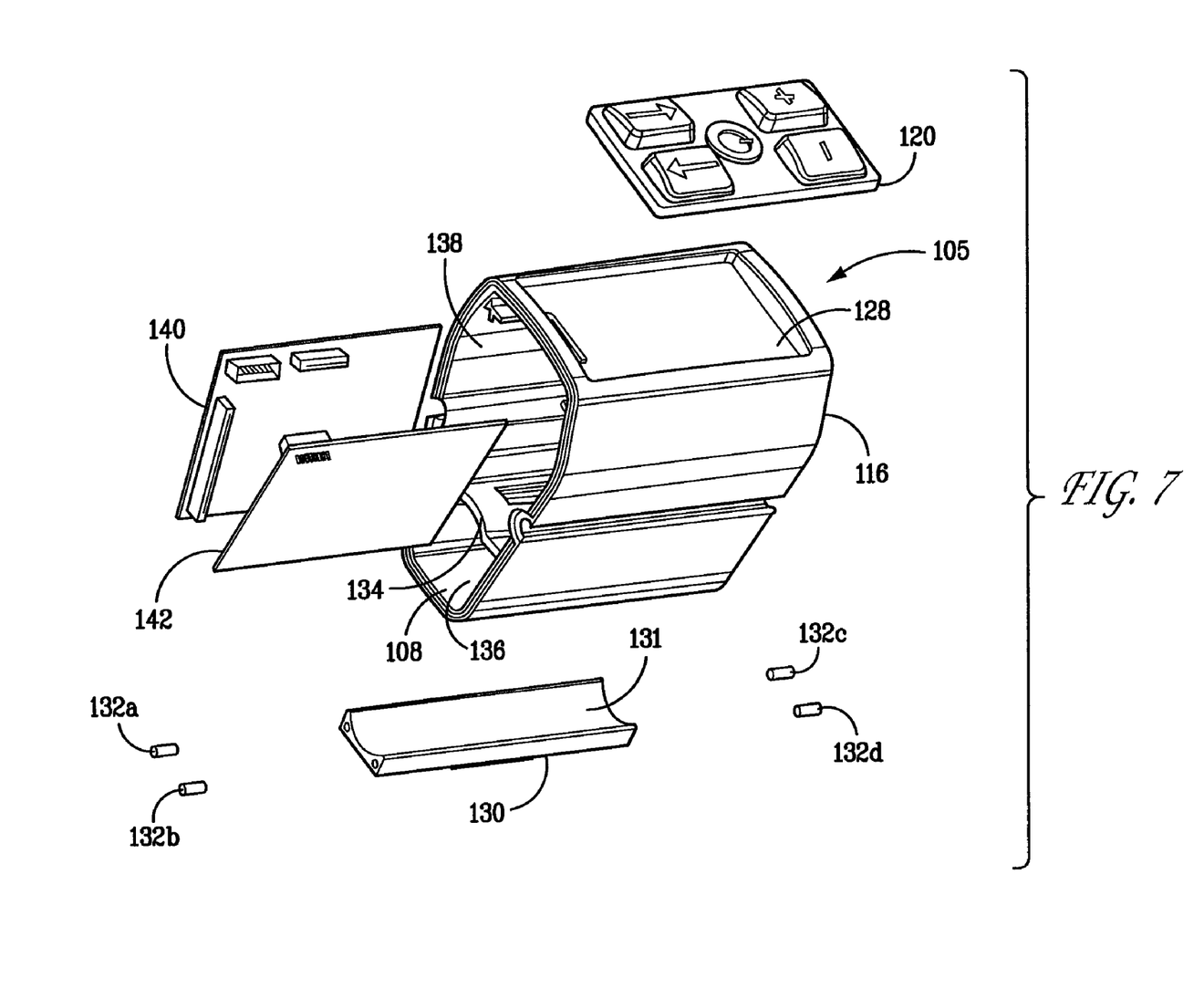
FIG. 7 is an exploded view of the housing of the exemplary low-light viewing assembly of FIG. 1.

Referring now to FIG. 7, an exploded view of housing 105 is shown. User interface 120 is shown, and rectangular recess 128 in top surface 106 is sized to receive user interface 120. Mount 130 is positioned above lower surface 108 and has a cylindrical surface 131 for receiving and supporting a battery. Pins 132a, 132b, 132c, 132d are received in bores at each end of mount 130 and extend outward to be engaged by corresponding bores in the end covers. Shelf 134 divides the interior of housing into battery compartment 136 in a lower portion of housing 105 and a main compartment 138 in an upper portion of housing 105. A watertight seal may be provided around wiring that carries power from battery contacts in battery compartment 136 into main compartment 138, so that replacement of the battery results in minimal risk of moisture entering the main compartment 138. All electronics may be contained in main compartment 138, and separated by a watertight barrier from battery compartment 136. Printed circuit board 140 may include electronics, including processors, memory devices, and power supplies, and related devices, for operation of display assembly 115. Printed circuit board 142 may include electronics, including processors, memory devices, and power supplies, and related devices, for operation of camera 110. Printed circuit boards 140, 142, are in main compartment 138.

Figures 8, 9:
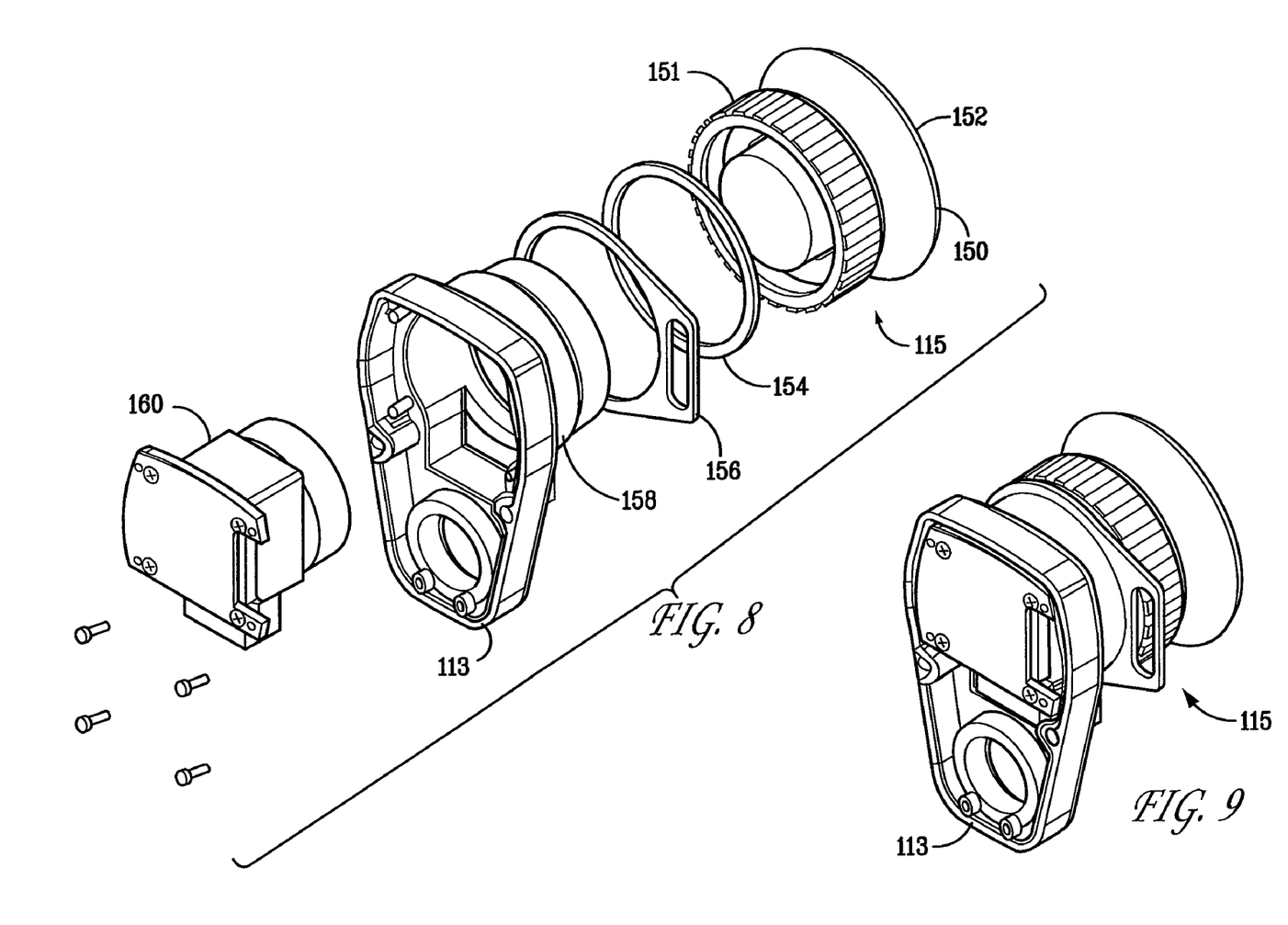
FIG. 8 is an exploded view of an end wall and display of the exemplary low-light viewing assembly of FIG. 1.
FIG. 9 is an assembled view of an end wall and display of the exemplary low-light viewing assembly of FIG. 1.

Referring now to FIG. 8, there is shown an exploded view of display assembly 115 and related end cover 113. FIG. 9 shows display assembly 115 and related end cover 113 assembled. Eye cover subassembly 150 is shown, having a generally frusto-conical shade or eye cup 152. Eye cover subassembly 150 is coupled to retaining ring 154. Eye ring strap 156 is coupled to cylindrical extension 158 of end cover 113. Eye cover subassembly 150 includes a diopter adjustment ring 151 which serves to adjust refraction of a diopter lens. Display subassembly 160 is shown. Display subassembly 160 may include an LCD display, although other digital displays may be employed. The display preferably has at least as high resolution as the camera. By way of example, the LCD display may have a 1280 by 720 pixel array, and be used with a camera having an 800 by 640 pixel CCD array. This exemplary configuration permits up to 8× digital zoom with no loss of detail.

Figures 10, 11, 12, 13:
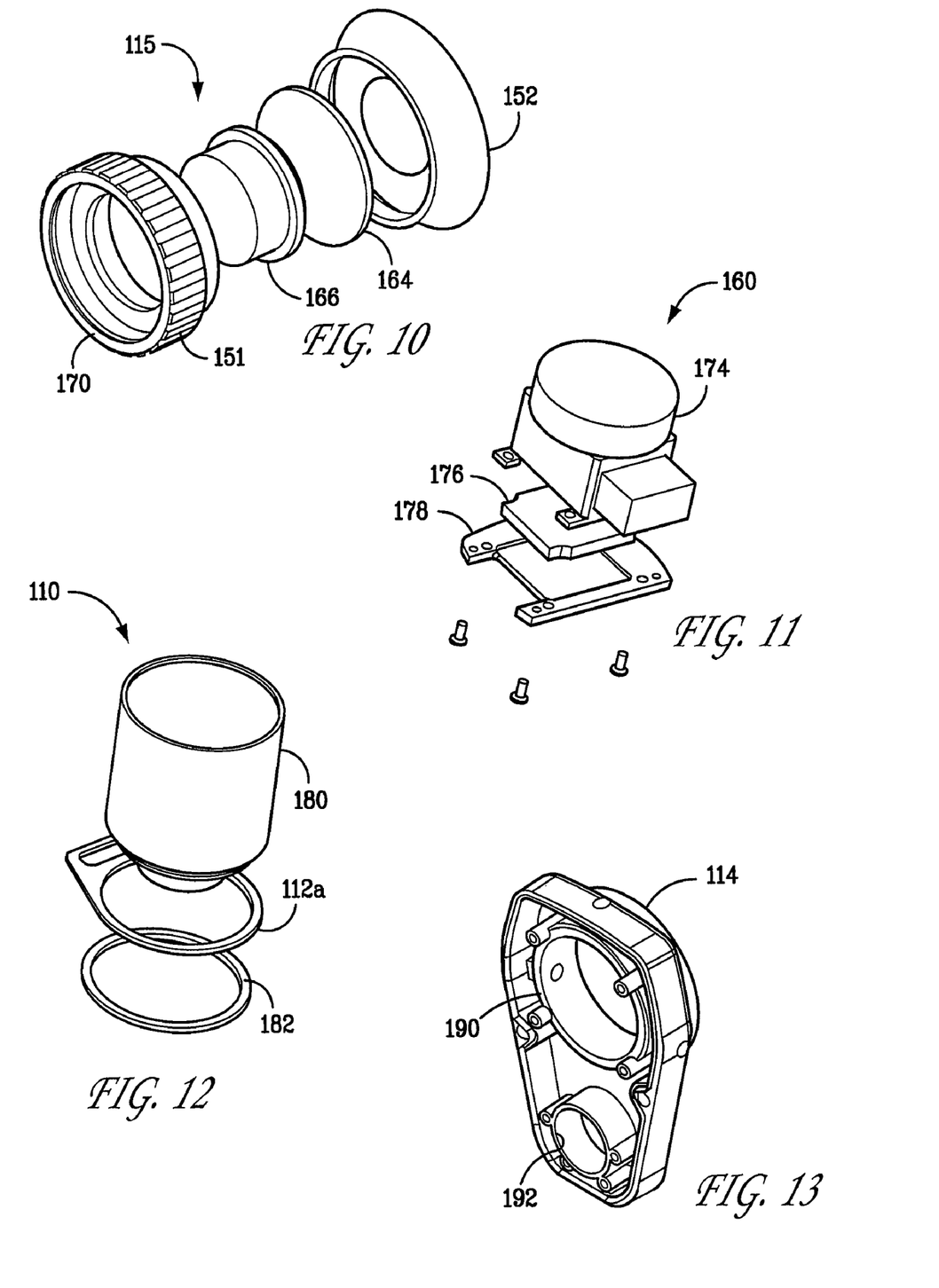
FIG. 10 is an exploded view of an eye cover subassembly of the exemplary low-light viewing assembly of FIG. 1.
FIG. 11 is an exploded view of a display subassembly of the exemplary low-light viewing assembly of FIG. 1.
FIG. 12 is an exploded view of a lens subassembly of the exemplary low-light viewing assembly of FIG. 1.
FIG. 13 is a view of a front housing cover of the exemplary low-light viewing assembly of FIG. 1.

Referring now to FIG. 10, there is shown an exploded view of eye cover subassembly 115. Shade or cup 152 receives protective lens 164. Display lens 166, which may be a diopter, is positioned interior to protective lens 164. Diopter adjustment ring 151 is coupled to and receives display lens 166. An O-ring 170 is provided in diopter adjustment ring 151 for a watertight seal to extension 158 of cover 113.

Referring now to FIG. 11, there is shown an exploded view of display assembly 160. LCD base 174 includes devices for receiving image signals and driving the LCD display 176. LCD base also includes devices that receive control signals input by the user at user interface 120 of FIG. 15. Display holder 178 supports LCD display 176.

Referring now to FIG. 12, there is shown an exploded view of a front lens subassembly 110, including lens 180, eye ring strap 112a, and retaining ring 182. Lens 180 may be a 35 mm lens, and may have an F stop of 1.0 or less and a T number of less than 1.5, which is particularly desirable for low light applications. Lens 180 may have a fixed focus, with a focal length of about 12 feet to infinity, which is preferable for low light applications. In some embodiments, lens 180 may have an F stop of 1.2 or greater, which may be desirable for daylight or other applications where there is greater ambient light. In some embodiments, lens 180 may be a zoom lens. However, as zoom lenses may typically have F stops of no less than about 1.6, and up to about 2.8 when fully extended, zoom lenses are less desirable in low light viewing conditions. Lens 180 may be rotatably mounted for adjustment of focus.

Referring now to FIG. 13, end cover 114 is shown. Opening 190 is provided for the camera. Below opening 190, end cover 114 is a continuous closed plate. Support 192, in the form of a generally cylindrical wall is shown. Support 192 may be provided to support battery contacts, for example.

Figure 14:
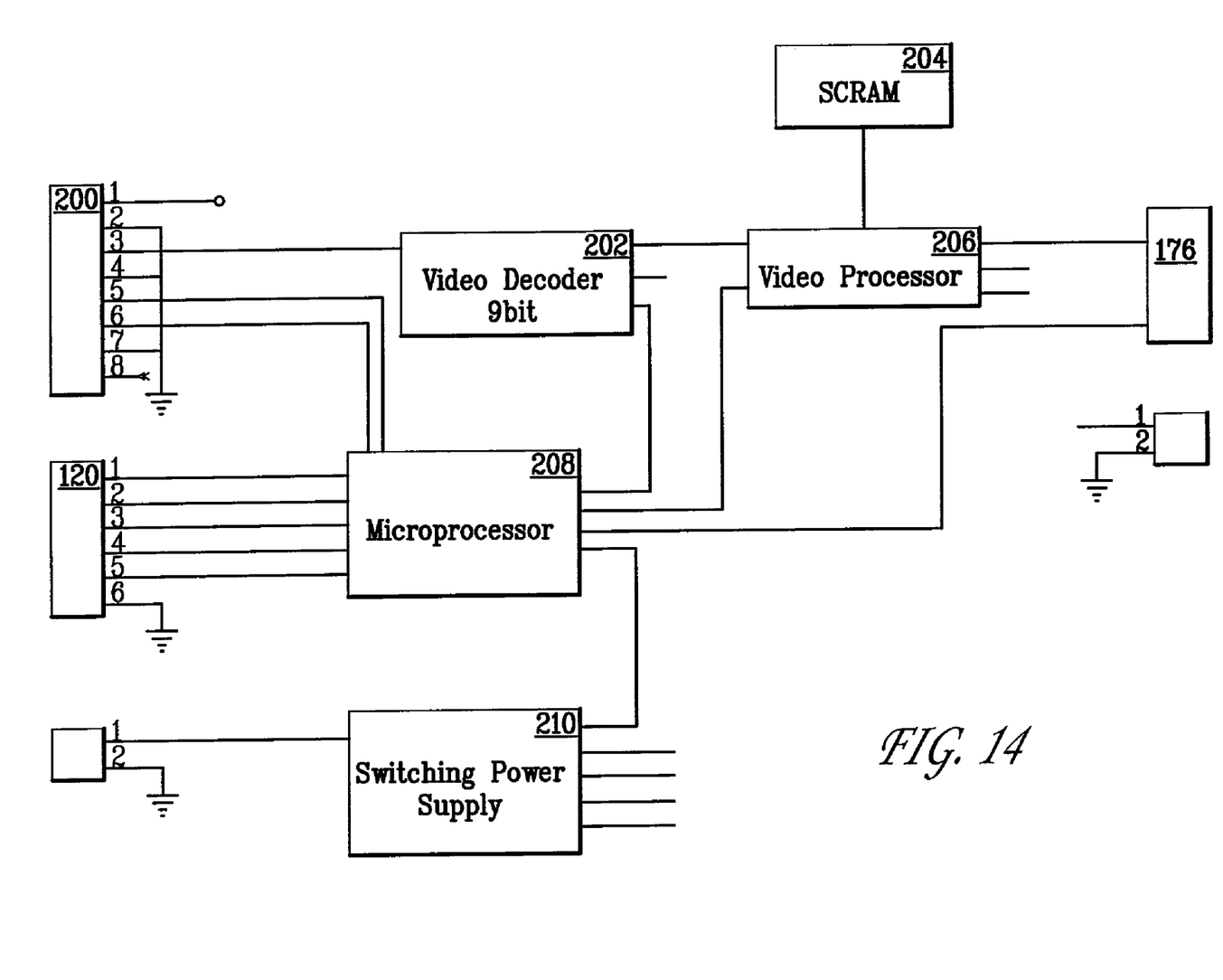
FIG. 14 is a block diagram of major components of the exemplary low-light viewing assembly of FIG. 1.

Referring now to FIG. 14, a block diagram of major electronic components of device 100 is shown. Camera 200 is adapted to output an analog data signal to video decoder 202. Camera 200 may include a CCD array of 800 pixels by 640 pixels, for example. Video decoder 202 receives the analog data signal from the camera 200, and digitizes and formats the data, to output a digital video signal to video processor 206. Video processor 206 formats the signal for display on display 176. A memory device 204 is associated with video processor 206. Memory device 204 may include a statistically converging recurrent associative memory (SCRAM), and may include one or more high speed memory devices. Processor 208 includes memory, and runs software which includes instructions that provide prompts to the user on display 176, and receives commands from user interface 120. Processor 208 outputs control signals to camera 200, video decoder 202, video processor 206 and display 176. Switching power supply 210 is coupled to a battery or other source of power, and provides power to the various components.

In an embodiment, software may include instructions to cause processor 208 to provide control signals to camera 200 and display 176 that are adapted for particular lighting environments. There may be provided two or more lighting environments, and a memory may store corresponding settings for each of camera 200 and display 176 for each lighting environment. The applicable lighting environment may be selected by the user through suitable inputs to user interface 120. For example, a first environment may be suitable for about 1000 lux to about 10,000 lux, and may be referred to as daylight.

Camera 200 may have the following settings having values set in accordance with instructions from processor 208. An integration setting, which determines whether light is collected in a single frame, at an integration setting of 0, or 2 or more frames, may be included. For example, if camera 200 operates at a speed of 30 frames per second, an integration setting of 0 indicates that a signal is received based on collection of light for a single frame, or not more than 1/30 of a second, and generally somewhat less than the full frame duration. An integration setting of 2× indicates that a signal is output based on light collected during two frames, or a duration of not more than 1/15 of a second. An ALC/ELC setting relates to control of shutter speeds. ALC designates manual shutter speed control, and ELC designates electronic shutter speed control. A level setting relates to setting a threshold signal level. An AGC setting determines whether automatic gain control is operating. A gain setting determines the applied gain. A priority setting determines the factor that should be the priority in setting the aperture and shutter speed. A gamma setting is a measure of the contrast level. It will be appreciated that all of these settings are well-known in the field of CCD cameras.

Display 176 also has a number of settings. A brightness setting is a measure of the output at each pixel. A contrast setting may be provided. A sharpness setting is provided. A gamma setting, which indirectly measures a contrast, is provided. An offset setting, which corrects for bias, is provided. It will be appreciated that all of these settings are well known in the field of digital displays.

In an exemplary daylight lighting environment, the camera settings may be selected as follows: Integration: 0; ALC/ELC: ELC; Level: Darker; AGC: OFF; Gain: min; Priority: GAIN; Gamma: 0.45. The display settings may be as follows: Brightness: A; Contrast: A; Sharpness: A; Gamma: 0.45; and offset: A.

In an exemplary setting suitable for a lighting environment having ambient brightness of about 10 to about 100 lux, which may correspond to twilight, the camera settings may be selected as follows: Integration: 0; ALC/ELC: ELC; Level: Darker; AGC: ON; Gain: max; Priority: GAIN; Gamma: 1.0. The display settings may be as follows: Brightness: A; Contrast: A; Sharpness: A; Gamma: 1.0; and offset: B.

In an exemplary setting suitable for a lighting environment having an ambient brightness of about 1 lux, which is about the brightness of predawn dusk, the camera settings may be selected as follows: Integration: 2×; ALC/ELC: ELC; Level: Lighter; AGC: ON; Gain: max; Priority: GAIN; Gamma: 1.0. The display settings may be as follows: Brightness: A; Contrast: A; Sharpness: A; Gamma: 1.0; and offset: C.

In an exemplary setting suitable for ambient brightness between about 0.01 and 0.1 lux, which may be about the brightness of a clear night with the moon between about one-quarter and full, and which may be referred to as a moonlight setting, the camera settings may be selected as follows: Integration: 4×; ALC/ELC: ELC; Level: Lighter; AGC: ON; Gain: max; Priority: GAIN; Gamma: 1.0. The display settings may be as follows: Brightness: 9; Contrast: 9; Sharpness: A; Gamma: 1.0; and offset: D.

In an exemplary setting suitable for an environment having ambient brightness between about 0.001 to 0.0001 lux, which may be about the brightness of an overcast night or a clear, moonless night, and which may be referred to as a starlight setting, the camera settings may be selected as follows: Integration: 8×; ALC/ELC: ELC; Level: Lighter; AGC: ON; Gain: max; Priority: GAIN; Gamma: 1.0. The display settings may be as follows: Brightness: 8; Contrast: 8; Sharpness: A; Gamma: 1.0; and offset: D.

It will be appreciated that the user may compare two or more settings in a given environment. By way of example, if in a night time environment, brightness is between about 0.001 lux and about 0.01 lux, then either a starlight or a moonlight setting may be preferable.

It will be appreciated that a display signal may be output to processor 208, which may change the environmental setting based on predetermined thresholds. For example, if the display exceeds a maximum darkness threshold, the environment may be changed to a darker environment.

By way of example, for lower light conditions, longer integration is included in the camera settings for the environment. For lower light conditions, a level selection of lighter is included in the camera settings. For lower light conditions, gamma is set to 1.0 in the camera settings. For display settings for lower light conditions, brightness and contrast may be reduced, particularly for an environment having light levels below about 0.1 lux. For display settings, differing offset setting for differing brightness environments has been found to be desirable.

The opposing end covers 113, 114 may be sealingly connected to central portion 116, so as to prevent moisture from entering the body. The opposing end covers 113, 114 may be removably attached, such as by reversible fasteners, such as screws, or by interference or friction fit, for access to components on the interior of the housing assembly (e.g., to replace circuit boards). Seals may be provided between end covers 113, 114, and lens 110 and viewer 115, respectively, to prevent moisture from entering the body.

A plurality of ridges may be formed on one or both sides of the assembly 100 to assist in providing a gripping surface. The ridges may additionally comprise a material having a high coefficient of friction for enhancing grip, such as an elastomer. Also to enhance grip, a thumb hold may be formed on the bottom of the device 100, and the thumb hold may additionally comprise a material having a high coefficient of friction for enhancing grip, such as an elastomer.

A user interface 120 (or a plurality of user interfaces or user control mechanisms) may be disposed on the top 106 of the device. One or more user interfaces mechanisms may alternatively be located elsewhere on the housing assembly. Other features may be provided in or on the housing 105, such as a lens cover, a tripod mounting socket, a hand or neck strap, or one or more mounts for a detachable strap. The device may have a portion of its housing adapted for mounting to a user's head/helmet, or to a weapon or similar device. Of course, the device may also be embodied in a set of goggles, or attached to or otherwise coupled to conventional goggles for enabling low light viewing and capture/recording of low light image data.

Device 100 may include one or more communications modules (e.g. a wireless communications device) for interfacing with an external communications device (e.g. a computer or other peripheral device via a USB port and connection). While two circuit boards are shown, for example in FIG. 6, circuits may be mounted on a single board, or, and circuitry responsive to tactile user input (via one or more switches) for controlling operating functions of the low-light viewing assembly. Multiple circuit boards may also be used and coupled to one another (e.g. via flexible connectors) for enhanced processing functionality, as is understood by those of ordinary skill in the art.

It is contemplated that some or all of the components of the assembly device may connect to the housing and to each other by interference or friction fit with grooves, projections, or other mating features provided therein or thereon, with the use of a minimal number of mechanical fasteners, to make assembly inexpensive and simple. Such fastening mechanisms include but are not limited to screws, bolts, rivets, adhesives, and the like.

Figure 15:
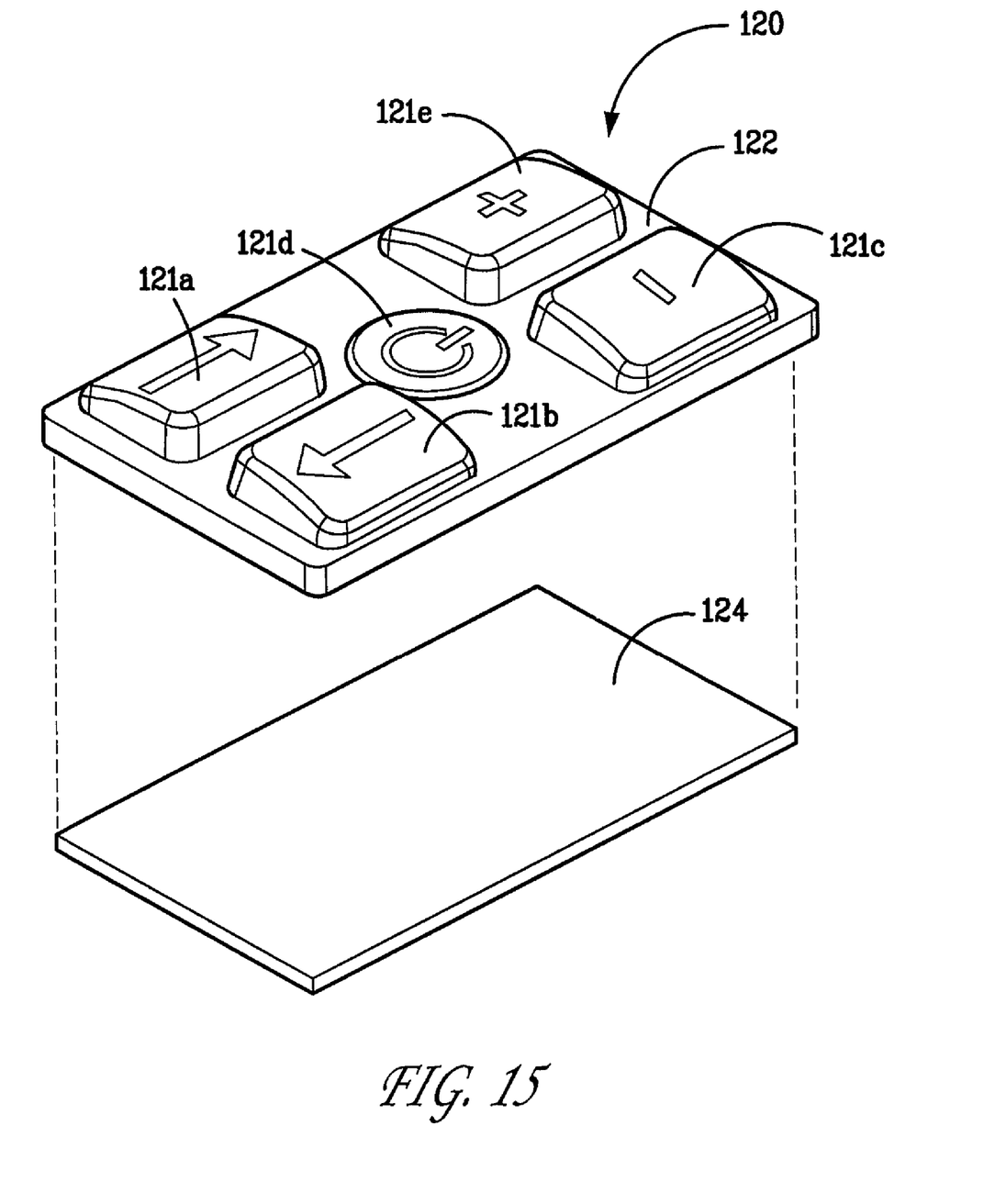
FIG. 15 is an exploded view of a keypad subassembly of the exemplary low-light viewing assembly of FIG. 1.

As may be seen in FIG. 15, which is an exploded view of exemplary user interface 120, a printed circuit assembly 124 may be included under an elastomeric or rubber keypad 122. Each switch on the keypad may be relatively high in profile, for example about 0.5 cm to about 1 cm. In the illustrated embodiment, all but one switch on keypad 122 is relatively high in profile, i.e., about 0.5 cm to about 1 cm, and a central switch, which may be an on/off switch, is relatively low in profile.

The user interface 120 may include one or more simple button controls that may be used to control or adjust various functions, including but not limited to on/off state of the device 100, zoom in of the electronic zoom, zoom out of the electronic zoom, changing the lighting environment to a brighter environment, changing the lighting environment to a darker environment, increasing the gain, and decreasing the gain. In one embodiment, buttons 121a, 121b control the electronic zoom; buttons 121c, 121e control the lighting environment setting or the gain, and central button 121d is an on/off button. The profile of central button 121d may be lower than the profile of the other buttons, so as to reduce the risk of the user inadvertently pressing the on/off button, and thereby powering the device down, while seeking to adjust other functions, such as electronic zoom or gain, or lighting environment.

In another exemplary embodiment, controls may be provided, such as through menus presented on the display, such as camera functions (e.g. image still capture or image video recording) and program functions (e.g. scrolling, controlling date/time settings, left/right hand operation, and programming features including camera mode, file save, digital zoom, ambient light conditions, reticle on/off).

User interface 120 may include a set of depressible buttons that are co-located within a region of the housing top 106 that is accessible via a single digit (i.e. finger/thumb) of a user while the user is holding the assembly and/or viewing objects using the assembly. Each of the different buttons may include a different surface that provides a different tactile feel to further enable a user to quickly select the desired function while maintaining visual contact with the target through the device. The top surface of each button may also have differing angles and curvatures relative to top surface 106. User interface 120 is an exemplary embodiment of a user interface, and alternative user interfaces may be provided.

In an exemplary embodiment, the sensor board is a Sony ICX428ALL ½" black and white EXview CCD sensor. In an exemplary embodiment, the camera board may be a camera board for a commercial ½" CCD security camera, which may have 4× digital zoom, and capability for power management for low power operation. An onscreen alphanumeric character display capability may be included. The video input may be RS170 monochrome.

In an exemplary embodiment, the display module may include an IMD 1280 by 720 monochrome 0.55" LCOS display panel, with variable rotating diopter setting.

In some embodiments, the power supply may be in the form of a battery module including a single 18650 lithium cell with a current rating of 2400 mAH.

In an exemplary embodiment, the lens may be a 35 mm lens with fixed focus, focused at 12 feet to infinity. The lens may have an F value of 1.0, and a focal distance of 4.3 mm. A multilayer magnesium fluoride antireflective coating may be applied to the lens.

It is of course understood that, in the camera, other image/vision sensors may also be used, such as a CMOS (complementary metal oxide semiconductor) image sensor (which may operate at a lower voltage than a CCD image sensor), for example.

A "LOW BATTERY" indicator may be provided via a red (or other color) light in the display.

It is of course understood that various types of display assemblies may be used, with such displays including but not limited to LCD (liquid crystal display), LCOS (liquid crystal on silicon), OLED (organic light emitting device), CRT (cathode ray tube), and plasma displays.

The video processor 206 contains circuitry for processing and formatting the signal output by the camera assembly 200 and video decoder 202, and displaying a corresponding image on the display 176. The video processor 206 may be a video module that provides a composite NTSC or PAL video signal on a monochrome display, providing an on-screen display, user-adjustable control over NTSC/PAL selection, backlight brightness, video contrast and brightness~gamma adjustment, and a color killer filter.

Processor 208 may provide various control signals to the camera 200, video decoder 202, video processor 206 and display 176. The microcontroller 114 receives control signals from the user control mechanism 120 to control certain functions, including but not limited to zoom, still/video capture, program functions and turning the assembly 100 on and off.

In certain embodiments, processor 208 may also provide control and/or data signals to an integral or external wireless communications assembly that may also interface directly with the digital signal processing circuit. The wireless communications assembly may include, for example, a TCP/IP stack, a transceiver, and an antenna, and may be used, e.g., to transmit to a remote device either a raw video signal from the camera 200, to be processed and formatted remotely, a decoded signal from video decoder 202, or a processed and formatted signal from video processor 206. Thus, a wireless communications assembly may permit device 100 to interface with, for example, an existing local area network via a standard wireless broadband router, or to interface with another external device for wirelessly receiving communications signals. A video out socket may be provided for wired transmission of a video signal to an external device, such as a monitor, television, or video recorder. Data may be exported via a port provided on the housing, such as a USB port or other such interface. By way of non-limiting example, a USB 2.0 compliant connector may be provided for transferring data to a speed of about 12 megabits per second.

An exemplary mode of operation of the low-light viewing assembly of the present invention is as follows. A user holds the device 100 in the user's hand (e.g. right hand or left hand) and depresses the on/off switch 121d to turn the assembly 100 on. The user raises the display 115 to the user's eye and looks at the display 115, while directing the lens 110 toward a location the user wishes to view. The user can view the image provided on the display 176, and can press the zoom in/zoom out switches to adjust the electronic zoom. The processor 208 may provide default light environment settings to the camera and display, such as the settings associated with the moonlight light environment described above. The user may employ user interface 120 to change the settings to another light environment, such as the daylight, twilight, or starlight environments.

Other functions may be controlled by the user through user interface 120. For example, camera/video function operations may be selectable by one of the input switches for still/video capture. For example, for right handed operation, a user may depress and release a switch to capture a still video image, or may depress and hold a switch to begin recording video data. A user may then release the switch to stop recording. Upon execution of the camera function, a user may depress the switch again to return to "normal" operation (i.e. low-light image viewing and ready to capture additional images) or the system may be pre-configured to automatically return to "normal" operation.

Upon completion of video image processing, a command prompt may appear alerting the user as to whether he/she desires to "SAVE" or "DELETE" the captured video. The user may respond by pressing buttons on user interface 106 to advance the display to the desired selection so as to either save or delete the video data. Exemplary program mode functions include placing the device in a camera mode, saving/deleting files, digital zoom, controlling ambient light conditions (e.g. setting thresholds), and providing reverse function buttons (e.g. for left-handed operation), time/language information, and reticle On/Off features. In one configuration, the device may be placed in program mode, which causes each of the other buttons to have a particular function, such as scrolling left, right, up or down.

A program mode may enable a user to modify the functionality associated with the given button geometry according to whether the user is left or right handed.

It is understood that the processor, memory and operating system with functionality selection capabilities can be implemented in hardware, software, firmware, or combinations thereof. In a preferred embodiment, the processor functionality selection, threshold processing, panel selection and mode configuration may be implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the program storage medium that constrains operation of the associated processors(s), and in the method steps that are undertaken by cooperative operation of the processor(s) on the messages within the signal and data processing network of the digital low-light viewing assembly. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

As previously discussed, processor 208 provides control signals to the camera and display in accordance with an environment selected by the user. In an embodiment, the user may select the values of individual parameters, such as integration, gain, and display brightness. In an embodiment, particularly useful for relatively high levels of ambient light, a zoom lens may be employed in place of the fixed focus lens. The processor may provide zoom in/out control signals to the zoom lens in response to user inputs. The processor may also include such controls as clock functions, and image capture controls, including, by way of example, image capture using a single switch for capturing still video images and storing the images in memory within the assembly for later retrieval and/or downloading.

In an exemplary embodiment, the assembly 100 is extremely lightweight, such as having a weight with batteries of not more than about 20 ounces.

It is further contemplated that a device consistent with the present invention, in addition to having utility as a standalone handheld viewer, may also have particular utility for other applications, e.g., as a sight for a gun or other weapon. While the embodiments described above and illustrated herein are configured as a monocular device, it is contemplated that the assembly could alternatively be embodied in a binocular display to provide stereoscopic views. Such binocular device configuration would also be contoured to a user's hand(s) to simple manipulation and ease of use.

While the embodiment described herein is a passive device, a device in accordance with an embodiment of the invention may include or have attached thereto a source of illumination, such as a long-range infrared illumination device. An advantage of including or having attached a source of infrared illumination is usefulness in total darkness or light levels so low as not to provide a useful display image.

Figure 16:
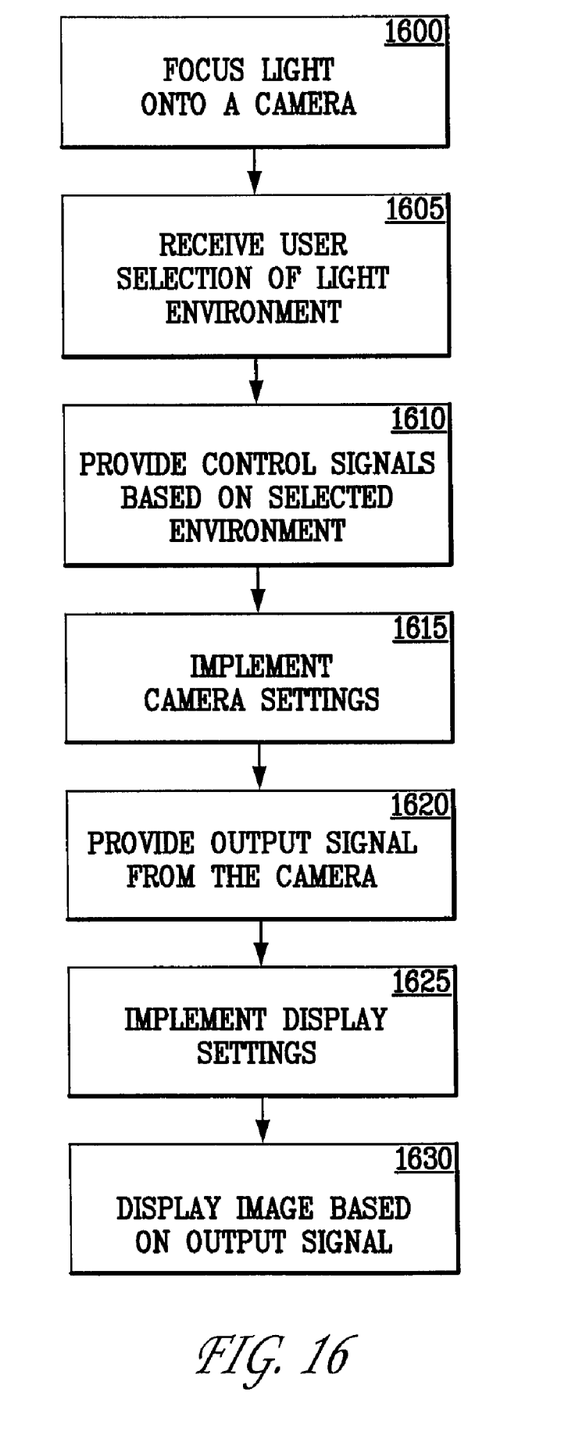
FIG. 16 is a process flow diagram of a process of providing a low-light image in accordance with an implementation of the invention.

Referring now to FIG. 16, in an implementation, a method for providing low-light viewing includes focusing 1600, via a lens mounted on a housing, visible and infrared light on to a camera within the housing; receiving 1605 a user selection of light environment level at a user interface on the housing; providing control signals 1610, based on the selected light environment, from a controller in the housing to the camera and to a display within the housing; implementing 1615 camera settings based on the control signals; providing 1620, from the camera, an output signal indicative of a focused image; implementing 1625 display settings based on the control signals; and displaying 1630 an image based on the output signal at the display.

Thus, it can be seen that the present invention provides digital low-light viewing device that can be easily and inexpensively manufactured, thereby making the device affordable to consumers, law enforcement agencies, security forces, first responders and the military.

An advantage of a digital low-light viewing device as disclosed herein having a fixed focus, fast lens with an F number of 1.0 or less and a T number of 1.5 or less is that there is little loss of illumination in the lens.

An advantage of a digital low-light viewing device as disclosed herein having greater resolution in the display than in the sensor is that digital magnification may be employed with no loss of detail.

Although the present invention has been set forth in terms of the embodiments described herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the present invention be interpreted as encompassing all alterations, modifications, or alternative applications as fall within the true spirit and scope of the invention.

What is claimed is:

1. A low-light viewing device, comprising:
   a housing, having mounted thereto:
      a lens having an F number of less than about 1, and a T number of less than about 1.5;
      a single image sensor for receiving light comprising visible light and near infrared light, said light focused by the lens along a single channel onto said single image sensor, said single image sensor providing an output signal responsive to visible light and near infrared light received by the lens;
      a display for receiving the output signal and displaying an image based on the image detected by the single image sensor responsive to visible light and near infrared light received by the lens;
      a controller operatively coupled to the image sensor and the display for controlling the image sensor and the display, and
      a user interface operatively coupled to the controller for operating the controller.

2. The low-light viewing device of claim 1, wherein the controller is programmed to provide control signals to the image sensor and display depending on a light environment level.

3. The low-light viewing device of claim 2, wherein said control signals comprise signals to set at least the following image sensor settings: integration, ALC/ELC, Level, AGC, Gain, Priority and Gamma.

4. The low-light viewing device of claim 2, wherein said control signals comprise signals to set at least the following display settings:
   Brightness, Contrast, Sharpness, Gamma and offset.

5. The low-light viewing device of claim 1, wherein said display has a resolution of at least 1280 by 720 pixels, and said image sensor has a resolution of at least about 800 by 640 pixels.

6. A low-light viewing device, comprising:
   a housing, having mounted thereto:
   a lens;
   a single image sensor having a resolution of at least about 800 by 640 pixels for receiving light comprising visible light and near infrared light, said light focused by the lens along a single channel onto said single image sensor, said single image sensor providing an output signal responsive to visible light and near infrared light received by the lens;
   a display having the resolution greater than a resolution of the sensor for receiving the output signal and displaying an image based on the image detected by the single image sensor responsive to visible light and near infrared light received by the lens;
   a controller operatively coupled to the image sensor and the display for controlling the image sensor and the display, and
   a user interface operatively coupled to the controller for operating the controller.

7. The device of claim 6, wherein the image sensor outputs an analog data signal, and further comprising a video decoder within the housing for receiving the analog data signal and outputting a digital video signal.

8. The device of claim 7, further comprising a video processor within the housing for receiving the digital video signal and formatting the digital video signal.

9. The device of claim 8, further comprising a statistically converging recurrent associative memory (SCRAM) device within the housing and associated with the video processor.

10. The device of claim 6, wherein the display has a resolution of at least about 1280 by 720 pixels.

11. A low-light viewing device, comprising:
    a housing having a planar top surface; opposing side walls which taper gradually outward from opposite edges of the top surface, and taper gradually inward to edges of a generally planar lower surface;
    a lens mounted on one end of the housing;
    a single image sensor within the housing for receiving light comprising visible light and near infrared light, said light focused by the lens along a single channel onto said single image sensor, said single image sensor providing an output signal responsive to visible light and near infrared light received by the lens;
    a display for receiving the output signal and displaying an image based on the image detected by the single image sensor responsive to visible light and near infrared light received by the lens and mounted on an end of the housing opposite the lens;
    a controller operatively coupled to the image sensor and the display for controlling the image sensor and the display, and
    a user interface defined in the top surface of the housing and operatively coupled to the controller for operating the controller;
    wherein the device is configured as a monocular.

12. The device of claim 11, wherein said side walls have thereon a resilient material having a high coefficient of friction.

13. The device of claim 11, wherein the device further comprises a battery in the housing, a weight of the device being not more than about 20 ounces.

14. The device of claim 11, wherein the housing is made of steel.

15. The device of claim 11, wherein: the lens has an F number of less than about 1, and a T number of less than about 1.5; the image sensor has a resolution of at least about 800 by 640 pixels;
    the display has a resolution of at least about 1280 by 720 pixels; the device comprises a battery in the housing; and a weight of the device is not more than about 20 ounces.

16. The device of claim 15, wherein the controller is adapted to provide camera settings to the image sensor and display settings to the display based on a selected light environment level.

17. A method for providing low-light viewing, comprising the steps of:
    focusing, via a lens mounted on a housing, visible and infrared light on to a camera within the housing;
    receiving a user selection of light environment level at a user interface on the housing;
    providing control signals, based on the selected light environment level, from a controller in the housing to the camera and to a display within the housing;
    implementing camera settings based on the control signals;
    providing, from the camera, an output signal indicative of a focused image;

implementing display settings based on the control signals; and displaying an image based on the output signal at the display.

18. The method of claim 17, wherein said camera settings comprise one or more of: integration, ALC/ELC, Level, AGC, Gain, Priority and Gamma.

19. The method of claim 17, wherein said display settings comprise one or more of: Brightness, Contrast, Sharpness, Gamma and offset.

20. The method of claim 17, wherein the lens comprises a fixed focus lens having lens having an F number of less than about 1, and a T number of less than about 1.5.

21. The method of claim 17, wherein the display has a resolution at least as great as the resolution of the camera.

22. The low-light viewing device of claim 1, wherein said image sensor comprises a Charge-Coupled Device (CCD) array image sensor or a Complementary Metal Oxide Semiconductor (CMOS) image sensor.

* * * * *